United States Patent [19]
Muromoto

[11] Patent Number: 6,079,296
[45] Date of Patent: Jun. 27, 2000

[54] ELECTRIC WIRE COVER PEELING TOOL

[75] Inventor: Osamu Muromoto, Hirakata, Japan

[73] Assignee: Muromoto Tekko Kabushiki Kaisha, Osaka, Japan

[21] Appl. No.: 08/817,019

[22] PCT Filed: Jul. 1, 1996

[86] PCT No.: PCT/JP96/01848

§ 371 Date: Apr. 8, 1997

§ 102(e) Date: Apr. 8, 1997

[87] PCT Pub. No.: WO97/06588

PCT Pub. Date: Feb. 20, 1997

[30] Foreign Application Priority Data

Aug. 9, 1995 [JP] Japan .................................. 7-203232

[51] Int. Cl.[7] .................................................. H02G 1/12
[52] U.S. Cl. ........................................... 81/9.43; 81/9.41
[58] Field of Search ............................. 81/9.4, 9.41, 9.43

[56] References Cited

U.S. PATENT DOCUMENTS

| | | | |
|---|---|---|---|
| 3,221,576 | 12/1965 | Goetz | 81/9.43 |
| 3,596,541 | 8/1971 | Bieganski | 81/9.43 |
| 3,763,723 | 10/1973 | Oprins | 81/9.43 |
| 4,112,791 | 9/1978 | Wiener | 81/9.43 |
| 4,395,928 | 8/1983 | Undin et al. | 81/9.43 |
| 4,557,164 | 12/1985 | Krampe | 81/9.41 |

FOREIGN PATENT DOCUMENTS

| | | |
|---|---|---|
| 57-34109 | 5/1982 | Japan . |
| 58-196516 | 12/1983 | Japan . |
| 61-153417 | 9/1986 | Japan . |
| 2-94410 | 7/1990 | Japan . |

*Primary Examiner*—David A. Scherbel
*Assistant Examiner*—Joni B. Danganan
*Attorney, Agent, or Firm*—Seed Intellectual Property Law Group, PLLC

[57] ABSTRACT

A wire cover peeling tool having a body that includes a clamp receiver and a grip. A clamp arm and an operation lever are pivotally coupled to the clamp receiver. A first slider slides within a groove of the clamp receiver and is coupled to a second slider that slides within a groove of the clamp arm. Blades extend inwardly from the tip of each slider for peeling an electrical wire cover. The blades, the sliders and the clamp arm are coupled to the operation lever 5 via a link unit. When the operation lever is pivoted, the blades and sliders cut a portion of the cover and extract the cut cover portion from a core of the wire.

16 Claims, 9 Drawing Sheets

ELECTRIC WIRE COVER PEELING TOOL

BACKGROUND OF THE INVENTION

1. Industrial Field of Utilization

The present invention relates to an electric wire cover peeling tool for peeling an insulation cover covering the outside of an electric wire.

2. Description of the Prior Art

Figure 10:
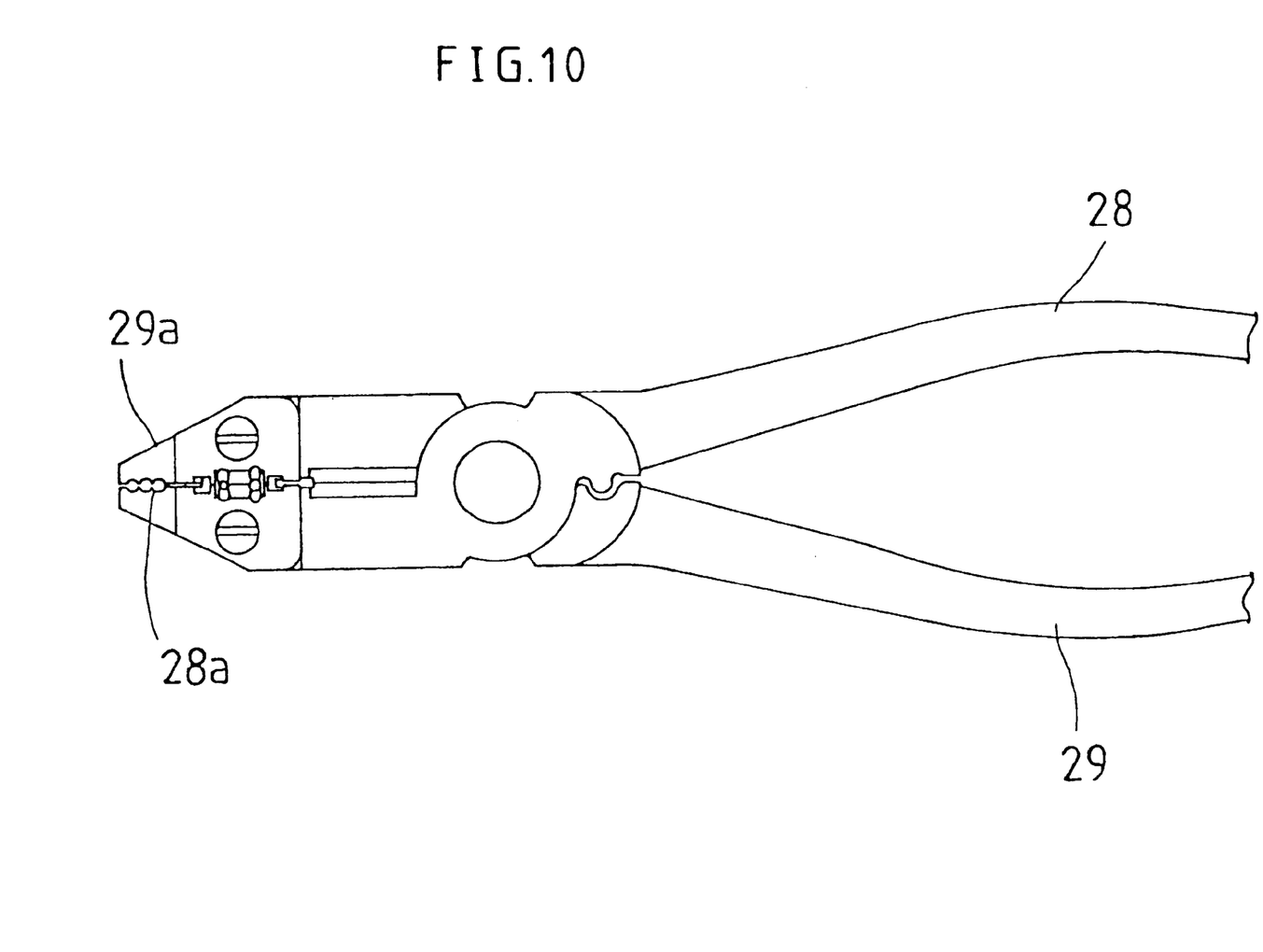
FIG. 10 is a schematic side view of a conventional apparatus.

The following tools have been conventionally used for peeling the cover from an electric wire, for example, a tool illustrated in FIG. 10 includes semicircular blades 28a and 29a respectively at tips of a pair of handling rods 28 and 29 rotatably supported in an X shape. An electric wire (not shown in FIG. 10) is held between the upper and lower blades 28a and 29a so that a cover of a tip of the electric wire may be pulled off the end of the wire. Another conventional tool described in Japanese TOKKYO KOKAI S52-18910 and illustrated in FIG. 11 is for holding an electric wire between a pair of movable rods 30 and 31 respectively arranging a cutter 30a on one rod and a handle 31a on the other rod to make the movable rods 30 and 31 open pivotally under this condition, thereby pushing the electric wire cover positioned at an outer portion of the cutter 30a (i.e., the right side in FIG. 11) outwardly.

Among the mentioned-above conventional electric wire cover peeling tools, the one illustrated in FIG. 10 requires handling the handling rods while extracting the wire cover, thereby causing problems such as damage to a core of the wire. Furthermore, the operational efficiency of the device may be poor.

Figure 11:
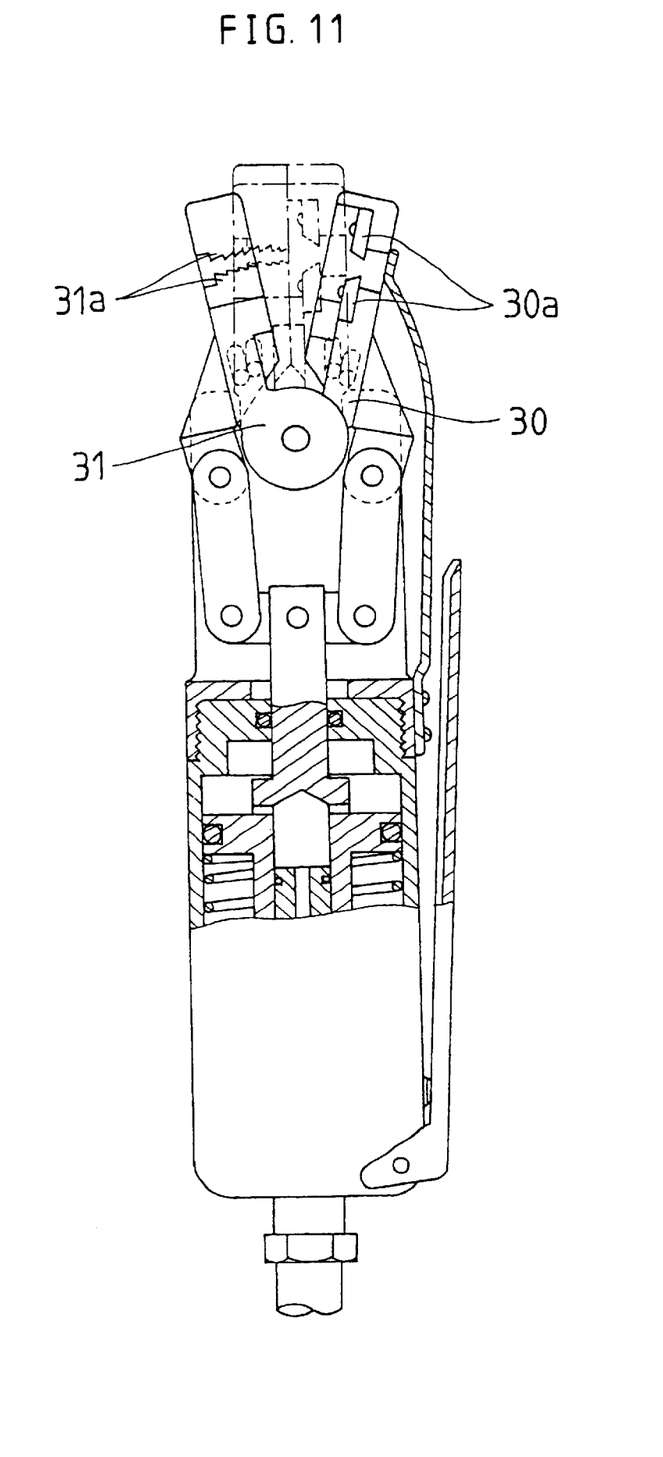
FIG. 11 is a partially omitted side view of another conventional apparatus.

Moreover, in the conventional device illustrated in FIG. 11, an electric wire is bent at the time the movable rods are pivotally opened so that an insulation cover cannot be smoothly pulled out, which may damage the core wire. Moreover, the operation requires a power source such as an air compressor or the like thereby increasing equipment cost and being inferior because a body of the tool is connected to power source via an air hose or the like.

SUMMARY OF THE INVENTION

The present invention is directed to solving problems with these conventional electric wire cover peeling tools.

According to an embodiment of the present invention, an electric wire cover peeling tool for peeling an insulation cover of an electric wire comprises a body having a clamp receiver at one side thereof defining a jaw. The body further has a grip at a second side thereof, a clamp arm rotatably connected to the body so as to be movable toward and away from the clamp receiver, and an operation lever rotatably connected to the body so as to be movable toward and away from the grip. The tool can further include a first slider slidably engaged with the clamp receiver, a second slider slidably engaged with the clamp arm, and a link assembly coupled between the operation lever and the clamp arm and between the operation lever and the second slider, for transmitting movement of the operation lever to the clamp arm and the second slider. A biasing device is coupled to the second slider for urging the second slider in a selected direction relative to the body via the link assembly.

DETAILED DESCRIPTION OF THE PREFERRED EMBODIMENTS

Referring now to the drawings, an embodiment of the invention is described in detail below.

Figure 1:
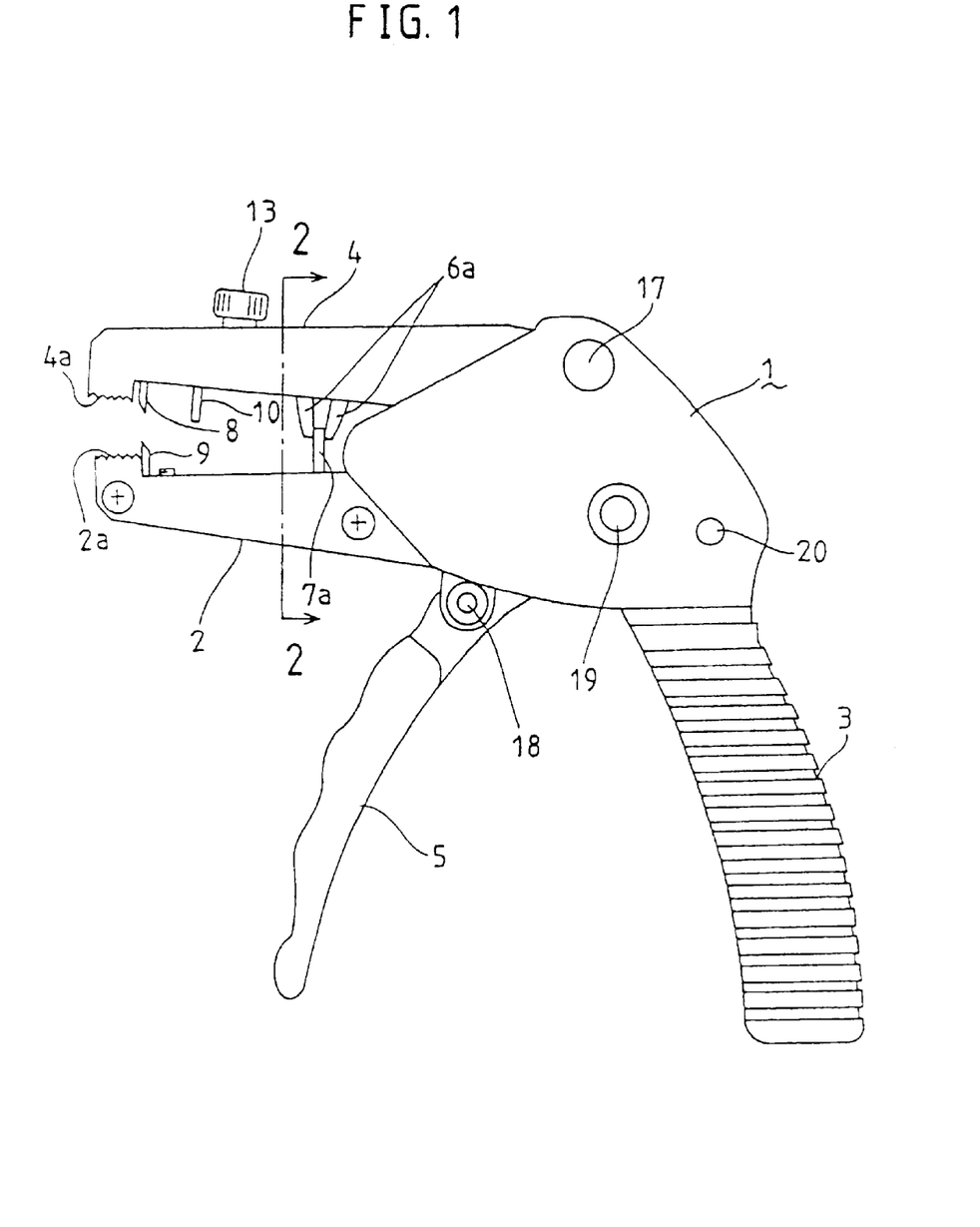
FIG. 1 is a side view showing an electric wire cover peeling tool according to the present invention.
Figure 2:
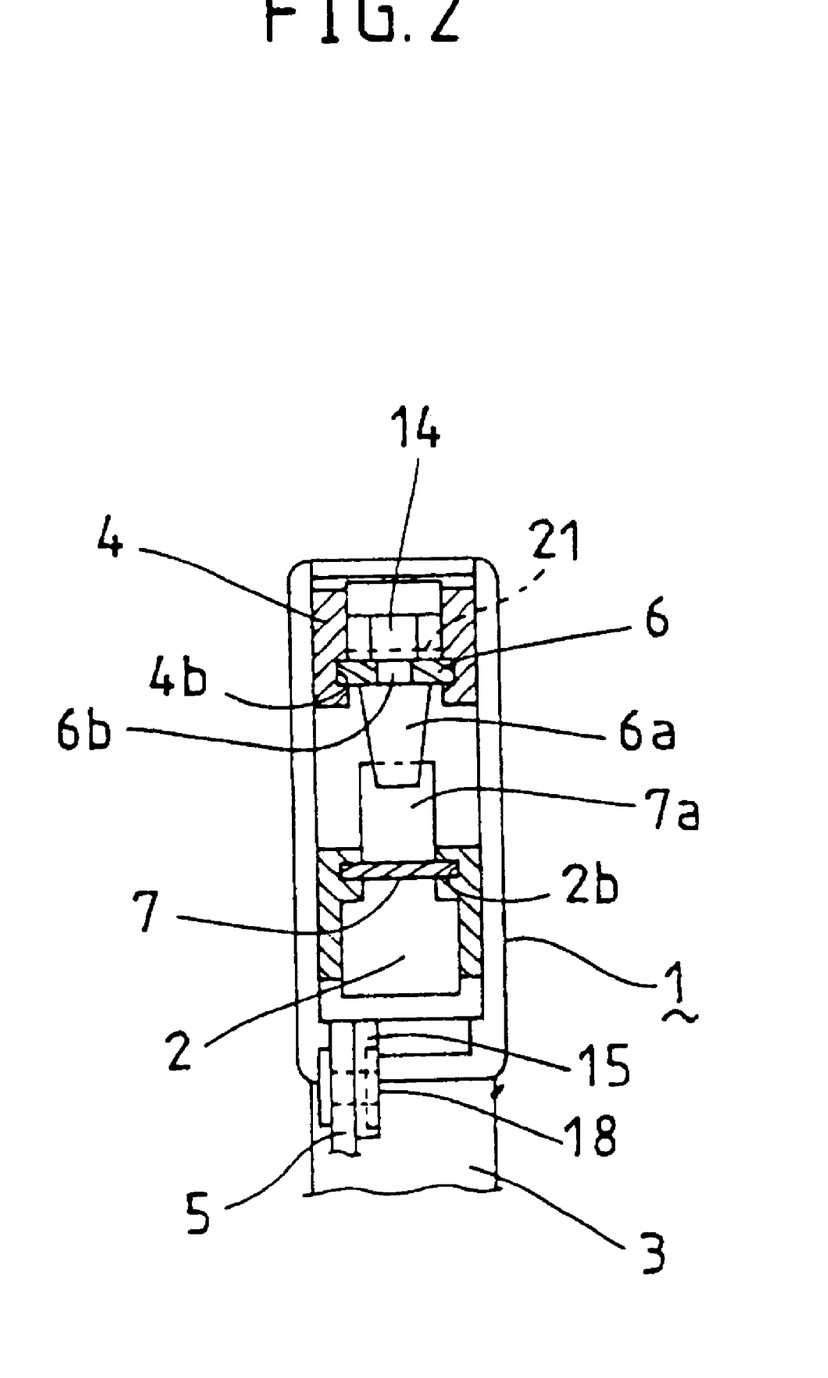
FIG. 2 is a sectional view along line A—A in FIG. 1.
Figure 3:
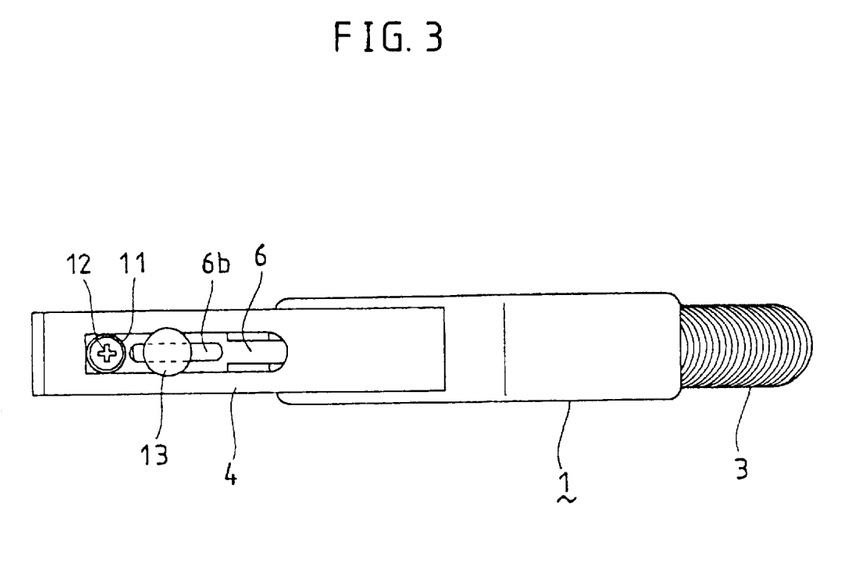
FIG. 3 is a plan view of the peeling tool illustrated in FIG. 1.
Figure 4:
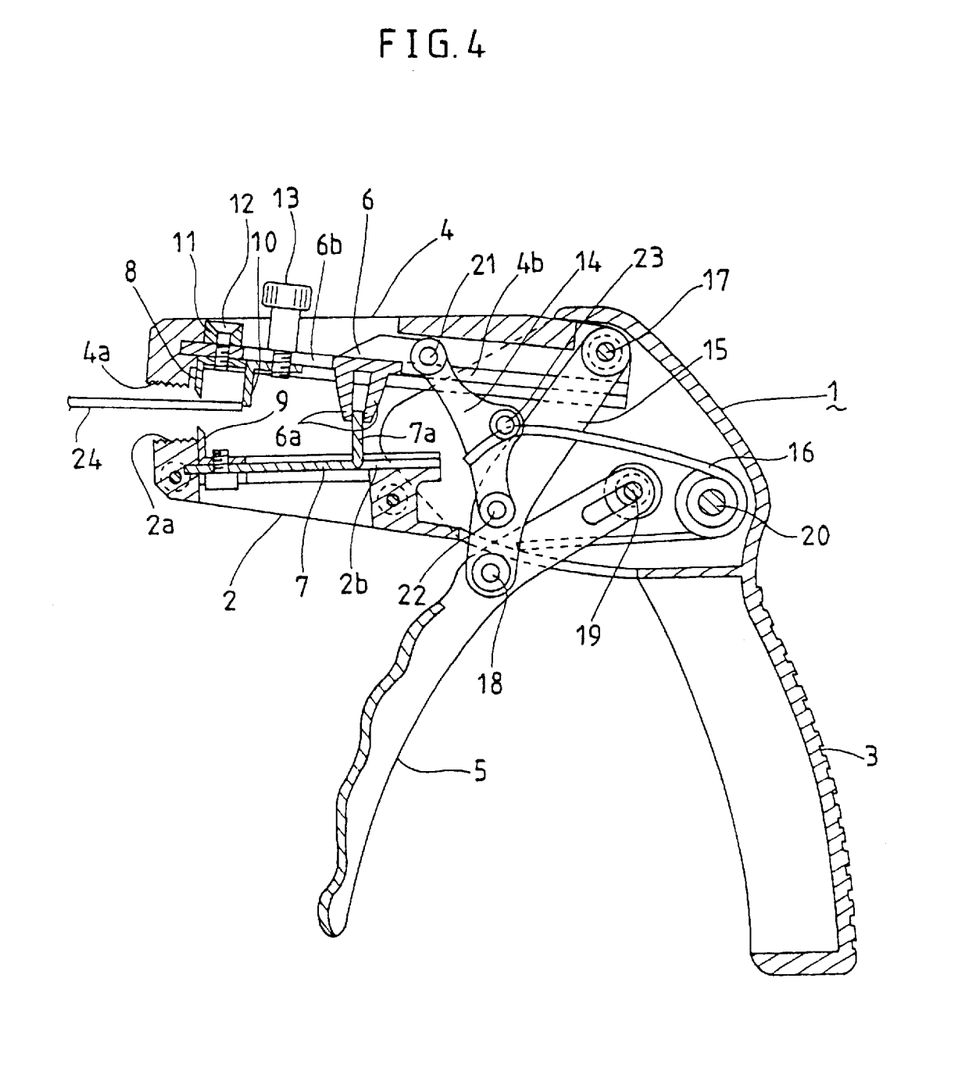
FIG. 4 is a longitudinal sectional view of the peeling tool illustrated in FIG. 1.

FIG. 1 is a side view showing the electric wire cover peeling tool according to the present invention. FIG. 2 is a sectional view along line A—A in FIG. 1. FIG. 3 is a plan view of the peeling tool illustrated in FIG. 1. FIG. 4 is a longitudinal sectional view of the peeling tool illustrated in FIG. 1. As shown in the Figures, the peeling tool for an electric wire cover according to the present invention includes a body 1 formed to have a clamp receiver 2 toward the front side thereof (i.e., the left side in FIG. 1) which defines a jaw. The body 1 further includes a grip 3 toward the back (i.e., the right side in FIG. 1) lower side thereof. In the illustrated embodiment, the grip is textured. A clamp arm 4 is rotatably coupled to the body 1 by a shaft 17 so as to be movable toward and away from the clamp receiver 2, and an operation lever 5 is rotatably coupled to the body 1 by a shaft 19 so as to be movable toward and away from the grip 3. In the illustrated embodiment, the operation lever has a number of indentations for receiving human fingers.

The clamp arm 4 is provided with a holding portion 4a at a tip thereof to face downward. The clamp arm 4 further includes a guide groove 4b for slidably guiding a second slider 6 in a longitudinal direction (the right and left directions in FIG. 4).

The clamp receiver 2 includes a holding portion 2a opposite to the holding portion 4a positioned at the upper side of the tip thereof. The clamp receiver 2 includes a guide groove 2b for slidably guiding a first slider 7 in a longitudinal direction (i.e., the right and left directions in FIG. 4).

Furthermore, both sliders 6 and 7 are engaged with each other by engagement portions 6a and 7a positioned at respective back portions thereof so as to be movable together. In the illustrated embodiment, engagement portion 6a is a tab and engagement portion 7a is a slot.

The tool further includes a link unit having link members 14 and 15. The link member 15 has one end connected to the body 1 by the shaft 17 of the clamp arm 4 and the other end connected to the operation lever 5 by a shaft 18. The other link member 14 has one end connected to the second slider 6 by a shaft 21 and the other end connected to the link member 15 by a shaft 22. A pin 23 is positioned in the middle of the link member 14. The pin 23 is urged to the front upper side by a kick spring 16 which is attached at the back portion of the body 1. An axle 20 fixes a center of the kick spring 16.

Figure 7:
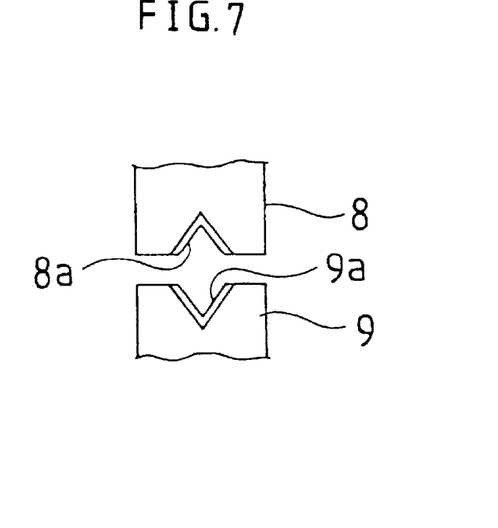
FIG. 7 is a front view of a state prior to the operation of blades employed by the electric wire cover peeling tool according to the present invention.
Figure 8:
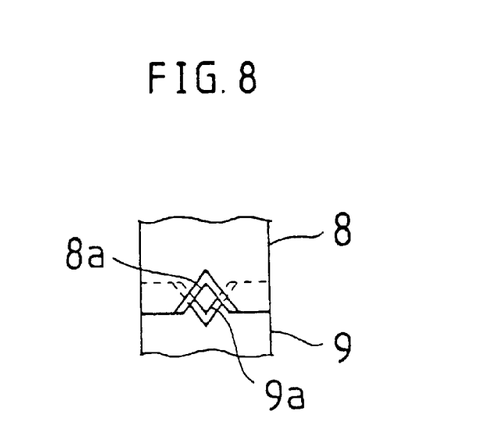
FIG. 8 is a front view of the operating state of the blades employed for the peeling tool for electric wire cover according to the present invention.
Figure 9:
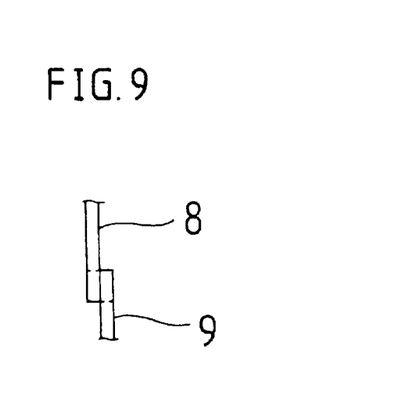
FIG. 9 is a side view of the operating state of the blades employed for the electric wire cover peeling tool according to the present invention.

Both sliders 6 and 7 are provided with blades 8 and 9 for peeling the electric wire cover. The blades 8 and 9 extend inwardly proximate to the tips of the holding portion 2*a* and 4*a*. As shown in FIG. 7 to FIG. 9, the blades 8 and 9 respectively include angular notches 8*a* and 9*a* at each edge of the blades 8 and 9. In cutting the electric wire cover as mentioned below, the tips thereof overlap each other thereby connecting them.

A stopper 10 is arranged at the second slider 6 by a fixing screw 13 so as to be adjustable. A brake collar 11 is arranged at the second slider 6 by a screw 12 so as to prevent the slider 6 from sliding, such as by operation of friction. A slide bore 6*b* is arranged for controlling a fixing position of the stopper 10.

Operation of the electric wire cover peeling tool of the present invention having the above structure is described below.

First, the fixing screw 13 is loosened before moving the stopper 10 move along the slide bore 6*b*, thereby determining the measure of the electric wire cover to be peeled, (i.e., the measure being equal to a distance between the blade 8 and the stopper 10). The stopper 10 is fixed at the desired position by tightening the screw 13. Next, the stopper 10 contacts an end of an electric wire 24 when the electric wire 24 is inserted from the tip of the peeling tool (i.e., the left side in FIG. 4), while the user holds the grip 3 and the operation lever 5. Then, the operation lever 5 is rotated counterclockwise about the shaft 19, whereby the link member 15 connected to the operation lever 5 is rotated counterclockwise, centering around the shaft 17. As a result, via the link member 14 connected to the link member 15 and the second slider 6 connected to the link member 14, the clamp lever 4 is rotated toward the clamp receiver 2 about the shaft 17. As the operation lever 5 is rotated counterclockwise, the second slider 6 is slidably arranged at the clamp arm 4, the second slider 6 is urged forward by the kick spring 16 which acts through the link member 14 and the brake collar 11 contacts an inner surface of the clamp arm 4 with the result that the brake collar 11 does not slide as it frictionally restricts motion of the second slider 6 during this phase of the operation.

Figure 5:
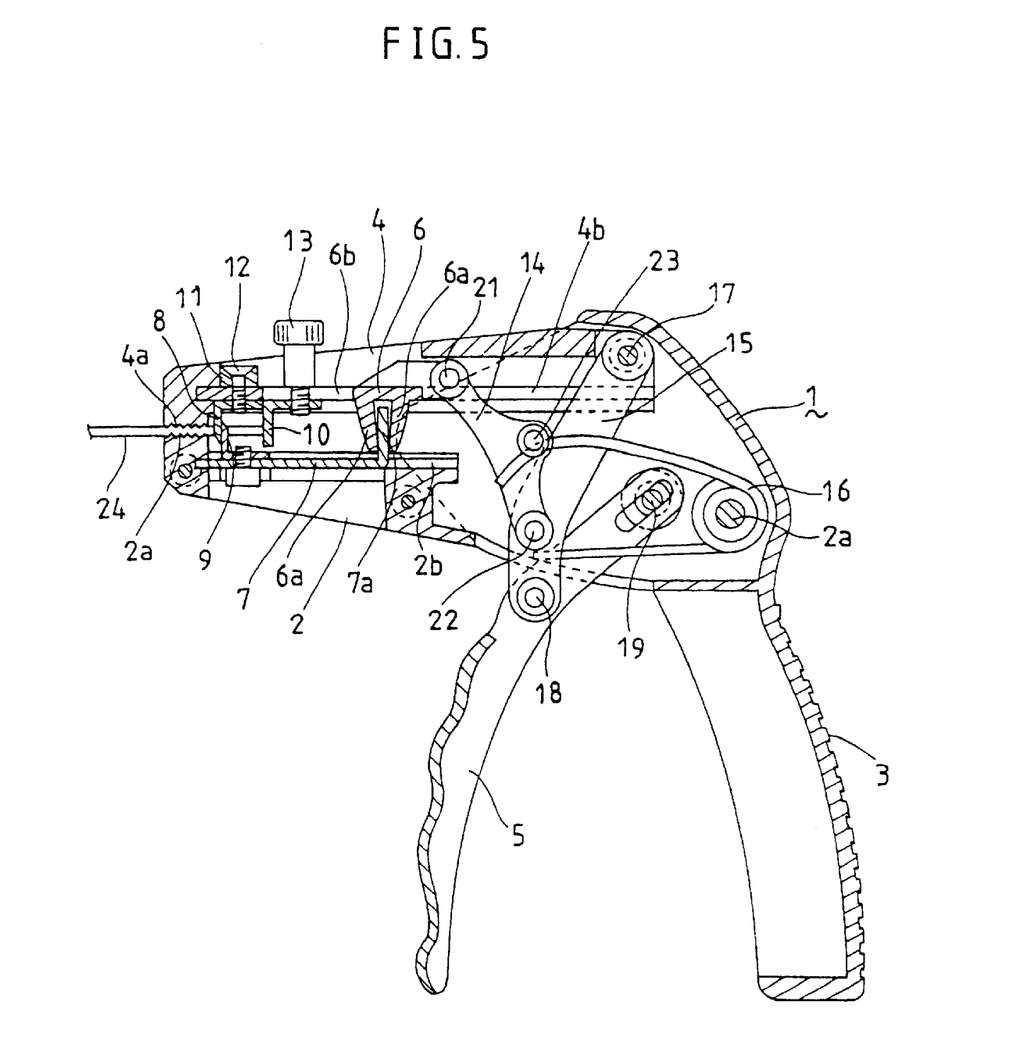
FIG. 5 is a longitudinal sectional view of a state in the middle of an operation of the peeling tool illustrated in FIG. 1.

Therefore, as shown in FIG. 5, the electric wire 24 is held between holding portions 4*a* and 2*a*. At the same time, as shown in FIG. 8 and FIG. 9, the tips of the blades 8 and 9 overlap each other and the angular notches 8*a* and 9*a* bite into the cover surrounding the electric wire 24, thereby cutting the cover for separation.

Figure 6:
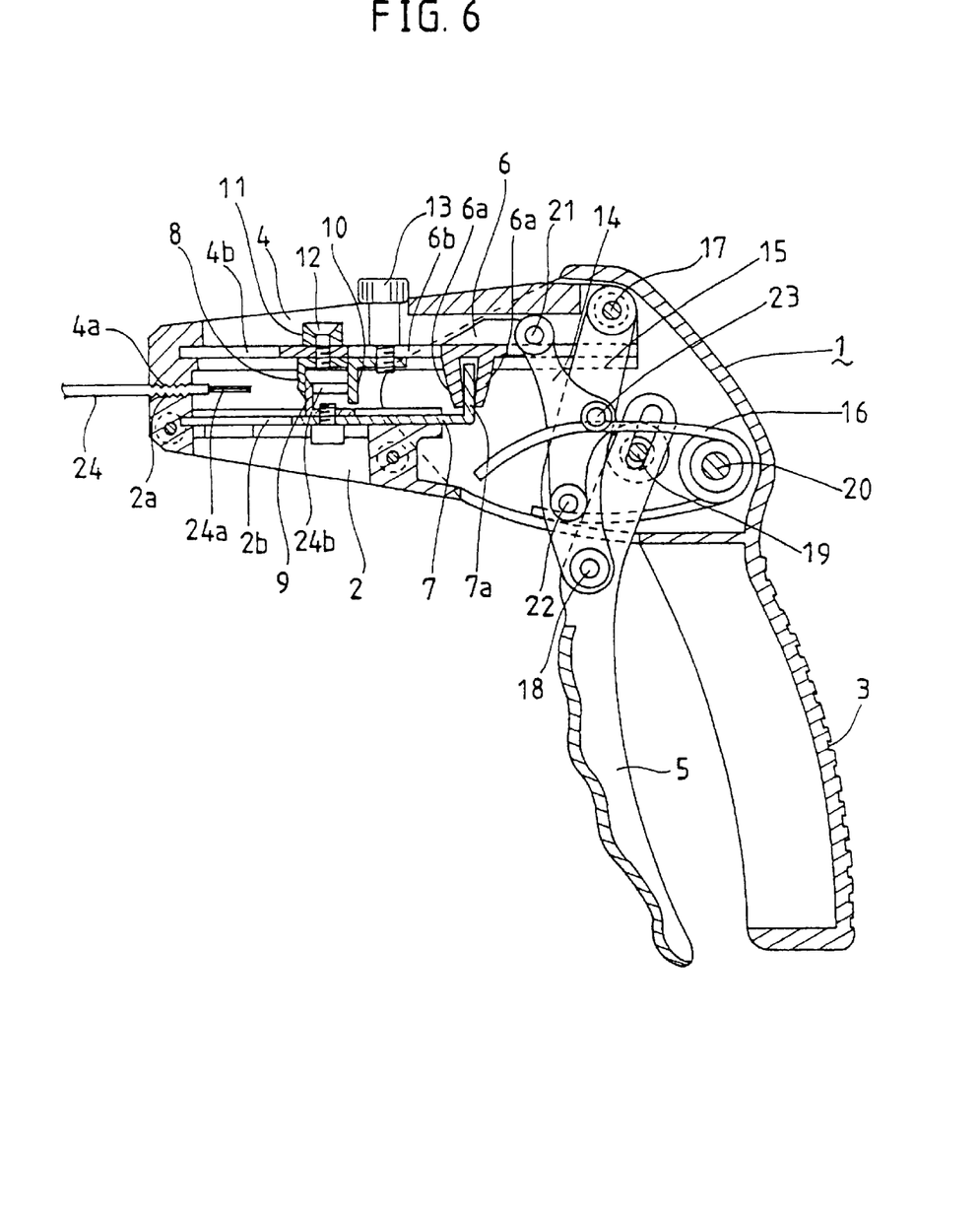
FIG. 6 is a longitudinal sectional view of a state at completion of the operation of the peeling tool illustrated in FIG. 1.

When the operation lever 5 is rotated further in a direction of the grip 3, the clamp arm 4 cannot be rotated further and the second slider 6 connected to the operation lever 5 via the link members 15 and 14 overcomes urging force of the kick spring 16 and sliding resistance of the brake collar 11 to move to the right side along the guide groove 4*b* of the clamp arm 4. At this time, the first slider 7 including the engagement portion 7*a* engaged with the engagement portion 6*a* of the second slider 6 is synchronously driven with the slider 6 along the guide groove 2*b*. Therefore, the blades 8 and 9 arranged at tips of the both sliders 6 and 7 bite into a cover 24*b* of the electric wire 24, which is stripped to expose a core wire 24*a*, as shown in FIG. 6.

After the electric wire cover 24*b* is peeled in this way and the operation is completed, the user releases the operation lever 5 so that the link member 14 urged by the kick spring 16 is pushed up to the upper side and pushed out to the left side with the result that the second slider 6 connected to the link member 14 and the first slider 7 engaged with the second slider 6 moves to the left side. The clamp arm 4 is rotated about the shaft 17, and both sliders 6 and 7 and the clamp arm 4 return to the initial operating position, as shown in FIG. 1 to FIG. 4.

Though the above embodiment illustrates that the upper and lower blades 8 and 9 are respectively provided with the angular notches 8*a* and 9*a*, the notches 8*a* and 9*a* may be any other shape such as semicircular and oval so long as they have shapes that bite into the cover 24*a* of the electric wire 24. Furthermore, the notches 8*a* and 9*a* may be arranged on a surface of a blade in a number of rows having different sizes according to diameter of the electric wire 24 or the like.

What is claimed is:

1. An electric wire cover peeling tool for peeling an insulation cover of an electric wire comprising:

a body having a clamp receiver at a first side thereof defining a jaw having a first tip to engage one portion of the insulation cover and a grip at a second side thereof, a clamp arm rotatably connected to the body so as to be rotatable toward and away from the clamp receiver, the clamp arm having a second tip opposite the first tip, the second tip to engage another portion of the insulation cover, an operation lever rotatably connected to the body so as to be rotatable toward and away from the grip, a first slider slidably engaged with the clamp receiver and slidable in a longitudinal direction relative to the clamp receiver, a second slider slidably engaged with the clamp arm and slidable in a longitudinal direction relative to the clamp arm, one of the first and second sliders having a tab, the other of the first and second sliders having a slot for receiving the tab to couple the first and second sliders and move the first and second sliders simultaneously, first and second blades each coupled to at least one of the sliders for cutting into the wire cover;

a link assembly, each connected between the operation lever and the clamp arm and between the operation lever and the second slider, for transmitting movement of the operation lever to the clamp arm and the second slider, and a biasing device coupled to the second slider for urging the second slider in a selected direction relative to the body via the link assembly.

2. An electric wire cover peeling tool according to claim 1, further comprising a stopper for contacting a tip of the electric wire thereby regulating a peeling length of the electric wire cover.

3. The tool of claim 1 wherein at least one of the first and second blades has a notch for receiving the electric wire.

4. A The tool of claim 1 wherein the grip is textured.

5. The tool of claim 1 wherein the operation lever includes indentations for receiving human fingers.

6. The tool of claim 1 wherein the first slider includes the tab and the second slider includes the slot, the tab being positioned at least partially within the slot and being movable within the slot.

7. The tool of claim 1 wherein the biasing device includes a spring having a first end pressed against the clamp receiver and a second end pressed against a portion of the link assembly.

8. The tool of claim 1 wherein the link assembly includes a first link and a second link, the first link having a first end and a second end, the first link being pivotably coupled toward the first end to the operation lever and pivotably coupled toward the second end to the body, the second link having a first end and a second end and being pivotably coupled toward the first end to the first link and being pivotably coupled toward the second end to the second slider.

9. The tool of claim 1, further comprising a stopper adjustably coupled to the second slider and movable relative to the first and second blades, the stopper having an engaging surface for engaging an end of the electric wire.

10. The tool of claim 1, further comprising a friction brake engaged with the second slider to inhibit motion of the second slider.

11. A tool for removing insulation from an electrical wire, comprising:

a body having a first end and a second end opposite the first end, the body having a first engaging portion toward the first end for engaging the insulation of the wire, the body having a grip portion toward the second end;

an arm pivotably coupled to the body and having a second engaging portion proximate to and movable relative to the first engaging portion for engaging the insulation of the wire;

a lever pivotably coupled to the body and rotatable toward and away from the grip portion;

a first slider slidably engaged with the body;

a second slider slidably engaged with the arm, the first and second sliders being slidably engaged with each other to move simultaneously;

first and second blades each coupled to at least one of the sliders;

a link assembly having at most two members pivotably coupled between the lever and the second slider to move the second slider relative to the arm when the lever is moved relative to the grip portion of the body; and a biasing device coupled between the second slider and the body to bias the second slider in a selected direction relative to the grip portion of the body.

12. The tool of claim 11 wherein the first slider includes a tab and the second slider includes the slot, the tab being positioned at least partially within the slot and being movable within the slot.

13. The tool of claim 11 wherein the biasing device includes a spring having a first end pressed against the body and a second end pressed against a portion of the link assembly.

14. The tool of claim 11 wherein the link assembly includes a first link and a second link, the first link having a first end and a second end, the first link being pivotably coupled toward the first end to the lever and pivotably coupled toward the second end to the body, the second link having a first end and a second end and being pivotably coupled toward the first end to the first link and being pivotably coupled toward the second end to the second slider.

15. The tool of claim 11, further comprising a stopper adjustably coupled to the second slider and movable relative to the first and second blades, the stopper having an engaging surface for engaging an end of the electric wire.

16. The tool of claim 11, further comprising a friction brake engaged with the second slider to inhibit motion of the second slider.

* * * * *

UNITED STATES PATENT AND TRADEMARK OFFICE
CERTIFICATE OF CORRECTION

PATENT NO.    : 6,079,296
DATED         : June 27, 2000
INVENTOR(S)   : Osamu Muromoto It is certified that error appears in the above-identified patent and that said Letters Patent is hereby corrected as shown below:

Section [75] on the title page of the issued patent should read --Osamu Muromoto, Osaka, Japan--.

Signed and Sealed this

Third Day of July, 2001

*Attest:*

NICHOLAS P. GODICI
*Attesting Officer*  *Acting Director of the United States Patent and Trademark Office*